United States Patent
Ahn et al.

(10) Patent No.: US 8,752,608 B2
(45) Date of Patent: Jun. 17, 2014

(54) DYNAMIC NANO-INSCRIBING FOR CONTINUOUS AND SEAMLESS METAL AND POLYMER NANOGRATINGS

(75) Inventors: Se Hyun Ahn, Austin, TX (US); Lingjie Jay Guo, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 9 days.

(21) Appl. No.: 13/264,181

(22) PCT Filed: Apr. 15, 2010

(86) PCT No.: PCT/US2010/031169
§ 371 (c)(1),
(2), (4) Date: Oct. 13, 2011

(87) PCT Pub. No.: WO2010/120982
PCT Pub. Date: Oct. 21, 2010

(65) Prior Publication Data
US 2012/0038085 A1  Feb. 16, 2012

Related U.S. Application Data

(60) Provisional application No. 61/169,398, filed on Apr. 15, 2009.

(51) Int. Cl.
*B22D 31/00* (2006.01)
(52) U.S. Cl.
USPC .......................................................... 164/69.1
(58) Field of Classification Search
USPC .......................................... 164/91, 69.1, 76.1
See application file for complete search history.

(56) References Cited

U.S. PATENT DOCUMENTS

2006/0258539 A1* 11/2006 Matsumoto et al. .......... 505/100

FOREIGN PATENT DOCUMENTS

KR  10-0755943 B1  9/2007

OTHER PUBLICATIONS

International Search Report and Written Opinion for PCT/US2010/031169, mailed Nov. 30, 2010; ISA/KP.
Peng, Ping et al., Scratch of submicron grooves on aluminum film with AFM diamond tip, Proceedings of the 2009 4th IEEE International Conference on Nano/Micro Engineered and Molecular Systems, Jan. 5-8, 2009, Shenzhen, China pp. 983-986. See Abstract, Figure 1 & Figure 6.
Youn, S.W.; Kang, C.G., Maskless pattern fabrication on pyrex 7740 glass surface by using nano-scratch with HF wet etching, Scripta Materialia, 2005, vol. 52, pp. 117-122. See Abstract, Fig. 1 and Fig. 7.
Hyon, C.K.; Choi, S.C., Nano-structure patterning and manipulation using a tapping mode atomic force microscope, Journal of the Korean Physical Society, Dec. 1999, vol. 35, pp. S987-S990. See Abstract and Fig. 1.

* cited by examiner

*Primary Examiner* — Kevin P Kerns
(74) *Attorney, Agent, or Firm* — Harness, Dickey & Pierce, P.L.C.

(57) ABSTRACT

Nanoscale grating structure can be utilized in many practical applications in optics, flat-panel displays and bio-sensors. A Dynamic Nano-Inscribing (Dynamic Nano-Inscribing) technique is disclosed for directly creating large-area, truly continuous nano-grating patterns in a variety of metal or polymer materials with feature size down to sub-50 nm and at very high speed (10 cm/sec). Dynamic Nano-Inscribing is carried out under either ambient temperature or with a brief heating time on the order of ten microseconds, which minimizes damage on UV or thermo-sensitive functional materials.

19 Claims, 6 Drawing Sheets

*Fig-1B*     *Fig-1C*

Figure 1A:
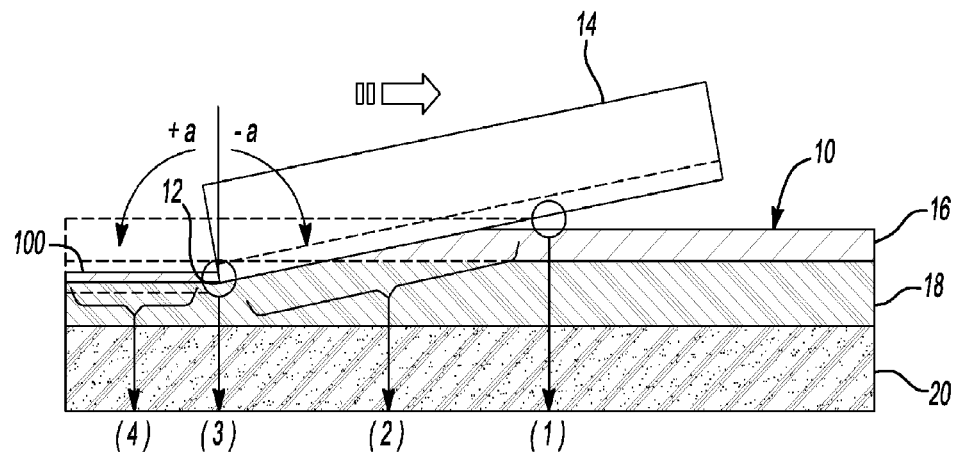

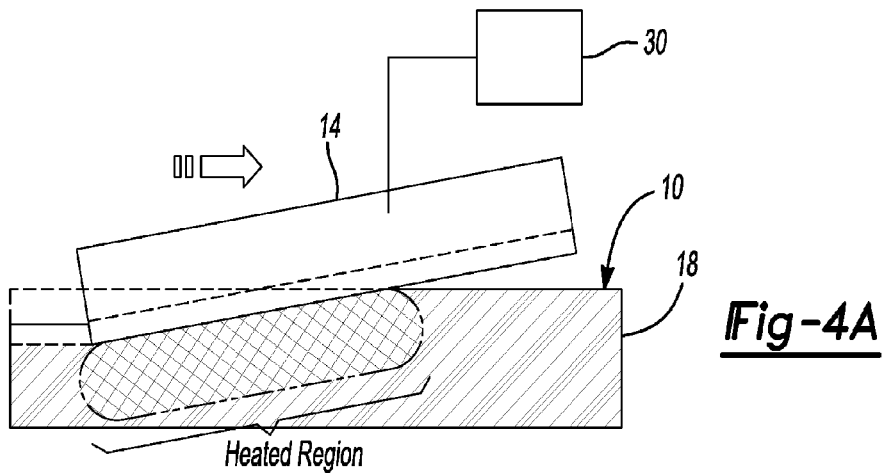
*Fig-4A*
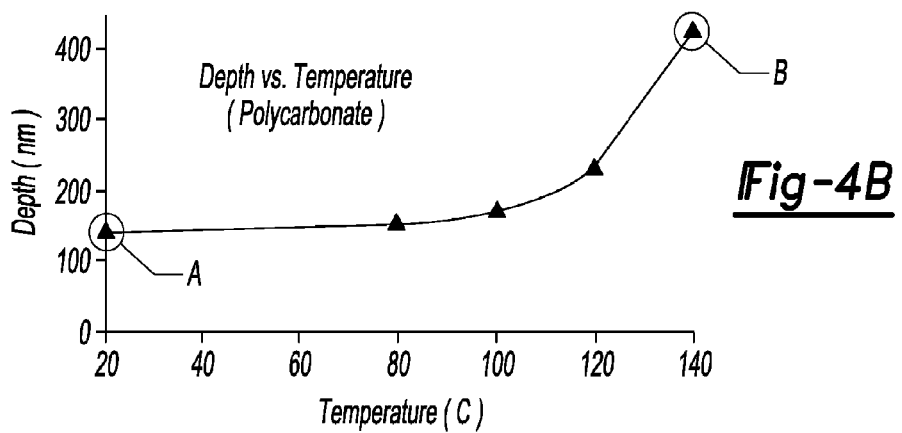
*Fig-4B*
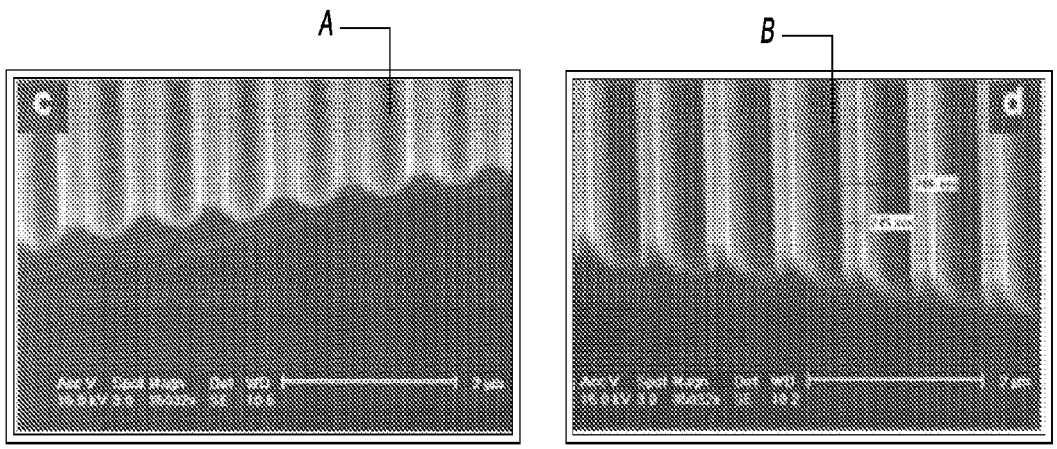
*Fig-4C*  *Fig-4D*

DYNAMIC NANO-INSCRIBING FOR CONTINUOUS AND SEAMLESS METAL AND POLYMER NANOGRATINGS

GOVERNMENT INTEREST

This invention was made with government support under Grant No. 0700718 awarded by the National Science Foundation. The government has certain rights in the invention

CROSS-REFERENCE TO RELATED APPLICATIONS

This application is a National Stage of International Application No. PCT/US2010/031169, filed Apr. 15, 2010, which claims the benefit of U.S. Provisional Application No. 61/169,398 filed on Apr. 15, 2009. The entire disclosure of each of the above applications is incorporated herein by reference.

FIELD

The present disclosure relates to nanofabrication techniques and, more particularly, relates to a dynamic nano inscribing process and apparatus for nanofabrication.

BACKGROUND AND SUMMARY

This section provides background information related to the present disclosure which is not necessarily prior art. This section also provides a general summary of the disclosure, and is not a comprehensive disclosure of its full scope or all of its features.

The increasing demands for nano-scale grating and channel structures in optics and bio-industries have stimulated many emerging technologies such as laser interference lithography, nano-ruling and nanoimprint lithography (NIL). Unfortunately, the current process and throughput of NIL, which is on the order of a few minutes per wafer, is insufficient to meet the currently demands of many practical applications, such as photonics, biotechnology, and organic optoelectronics.

Recently, however, High-Speed, Roll-to-Roll Nanoimprint Lithography (R2RNIL) was developed to provide improved throughput while preserving nanoscale resolution. Unfortunately, the UV or high temperature heating process inherent in R2RNIL may damage sensitive resist materials. Moreover, the method of R2RNIL results in an unavoidable seam region where the two ends of the flexible mold meet on the roller. This unavoidable seam region interrupts the otherwise continuous patterns. Still further, it has been difficult to fabricate the large area original imprint molds that are used in R2RNIL to replicate flexible stamps.

According to the principles of the present teachings, nanoscale grating structure can be utilized in many practical applications in optics, flat-panel displays and bio-sensors. A Dynamic Nano-Inscribing (Dynamic Nano-Inscribing) technique is disclosed for directly creating large-area, truly continuous nano-grating patterns in a variety of metal or polymer materials with feature size down to sub-50 nm and at very high speed (10 cm/sec). Dynamic Nano-Inscribing is carried out under either ambient temperature or with a brief heating time on the order of ten microseconds, which minimizes damage on UV or thermo-sensitive functional materials.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1D:
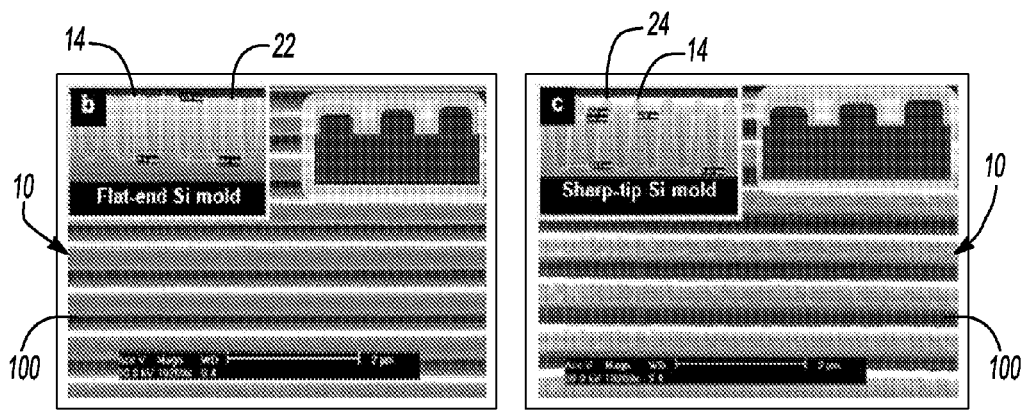
Figure 1D:
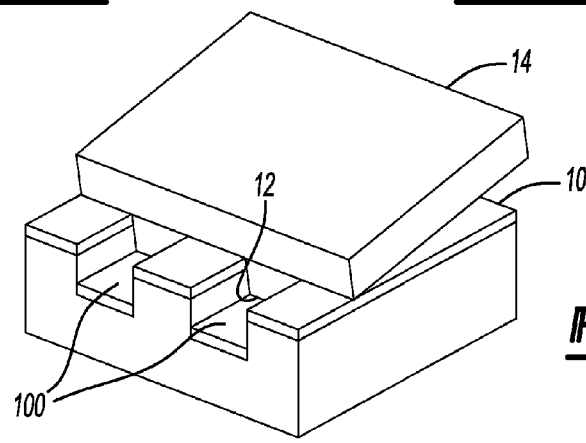

FIG. 1 illustrates (a) schematics of the Dynamic Nano-Inscribing process according to the principles of the present teachings for creating metal nano gratings wherein section (1) is the initial contacting point, section (2) is the gradual imprinting region, section (3) is the edge point responsible for plastic deformation and section (4) is the elastic recovery region. FIGS. 1b and 1c are SEM images of the Si molds with two different tip geometries (flat-end, sharp tip) and the resulting silver nano gratings inscribed by each mold, respectively. FIG. 1d is a perspective view of the mold and substrate of the present teachings.

FIG. 2 illustrates SEM images of (a) continuous 200 nm period gold gratings by Dynamic Nano-Inscribing with sharp turns, (b) Square-shaped gold nano-patterns fabricated by two sequential Dynamic Nano-Inscribings in orthogonal directions, and (c) 700 nm period grating directly fabricated on ITO surface.

Figure 3A:
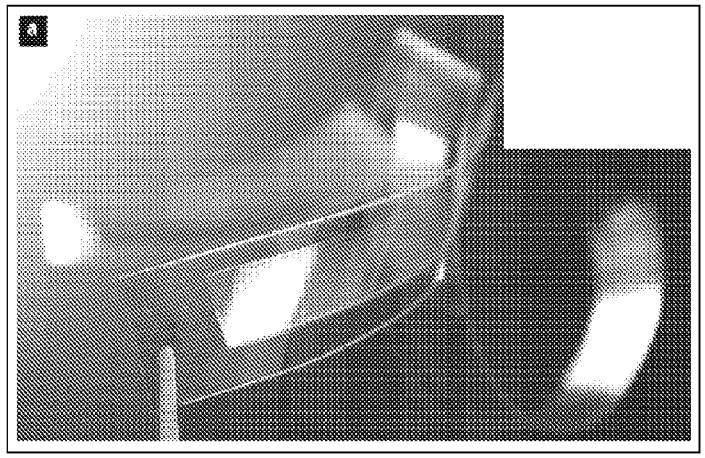
Figure 3B:
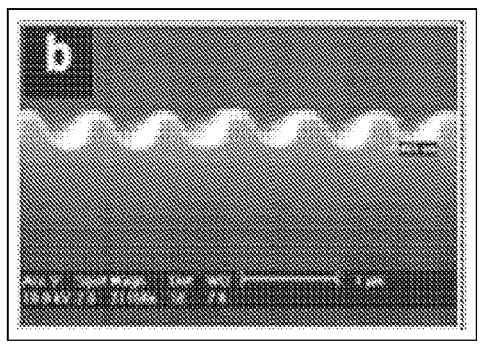
Figure 3C:
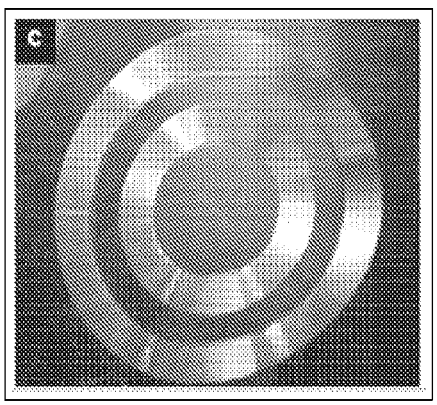
Figure 3D:
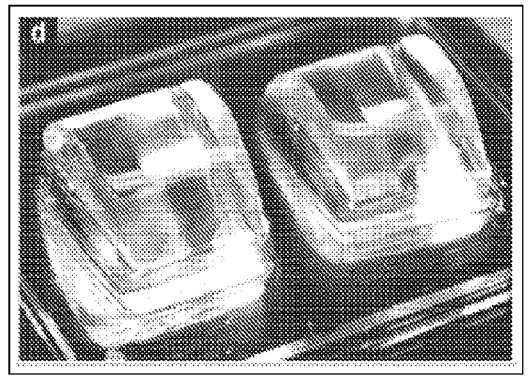

FIG. 3 illustrates (a) a 22 inch long, half inch wide, 700 nm period, continuous nano-grating pattern directly created on a polycarbonate strip by roll-to-roll Dynamic Nano-Inscribing process and (b) its SEM image, FIG. 3(c) illustrates concentric nano-gratings on ethylene-tetrafluoroethylene film fabricated by a rotating Dynamic Nano-Inscribing process (outer diameter is 2 inch), and FIG. 3(d) illustrates 700 nm period gratings inscribed in crosslinked photoresist SU8 on curved surfaces.

Figure 4E:
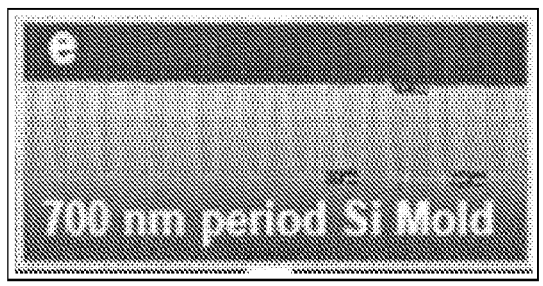

FIG. 4 illustrates (a) a schematic of the localized heating assisted Dynamic Nano-Inscribing (LH-DNI) process, FIG. 4(b) illustrates an inscribed depth in the polycarbonate film versus temperature, FIG. 4(c) illustrates 700 nm period polycarbonate gratings fabricated by room-temperature Dynamic Nano-Inscribing, FIG. 4(d) illustrates the polycarbonate sample fabricated at 140° C. showing sharper and more faithful pattern formation, wherein the inset FIG. 4(e) shows the Si mold used to produce FIGS. 4(c) and (d). FIGS. 4(f) and (g) illustrates 700 nm period gratings created by LH-Dynamic Nano-Inscribing on conductive polymer PEDOT and semi-conducting polymer P3HT coated on PET substrate (90° C.) and their corresponding AFM images shown in the insets, respectively. FIG. 4(h) illustrates 700 nm period gratings generated on proton exchange polymer, Nafion by LH-Dynamic Nano-Inscribing (80° C.).

Figure 5A:
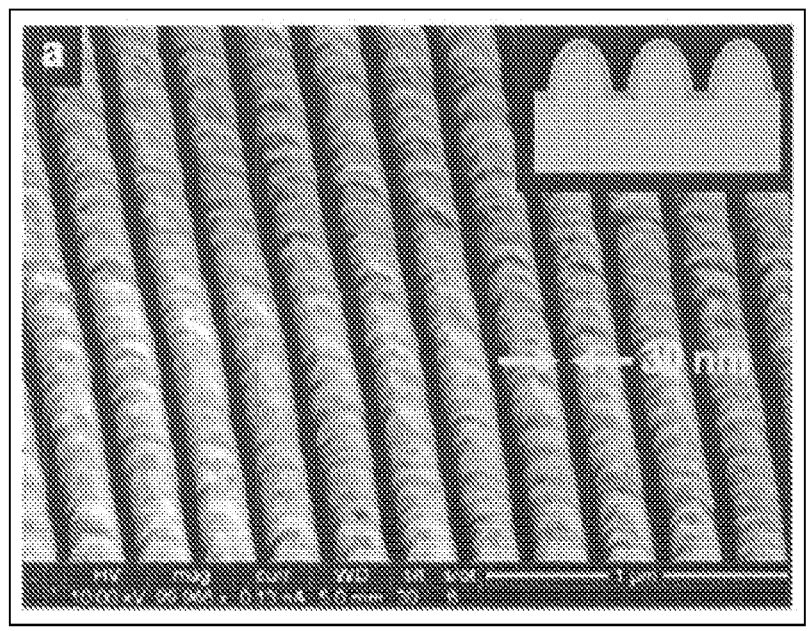
Figure 5B:
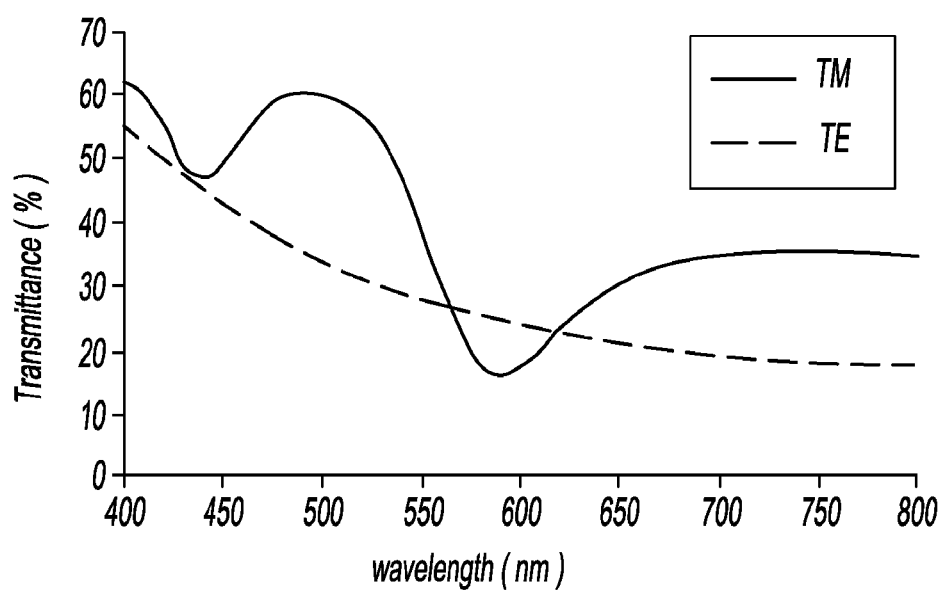

FIG. 5(a) illustrates 200 nm period silver gratings fabricated by Dynamic Nano-Inscribing, wherein 20 nm thick silver is thermally deposited on polycarbonate film and simply inscribed using a 200 nm period Si mold. FIG. 5(b) is a graph illustrating the transmittance spectra of sample (a) showing valleys at 430 and 590 nm which are due to electrical and magnetic resonances, respectively.

Corresponding reference numerals indicate corresponding parts throughout the several views of the drawings.

DETAILED DESCRIPTION

Embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, a Dynamic Nano-Inscribing (DNI) technique is provided that offers drastically increased throughput and nanoscale resolution, while providing continuous and seamless grating patterns at ambient condition or with very short time heating. Using Dynamic Nano-Inscribing according to the present teachings, high-speed nanopatterning of metals and several important functional polymers has been demonstrated and illustrate its versatile use in producing free-form array patterns and patterning over curved surfaces.

As illustrated in FIG. 1a, the mechanism of the Dynamic Nano-Inscribing process, according to some embodiments, used to create metallic nanopatterns 100 on a polymer substrate 10 uses the sharp edge 12 of slightly tilted cleaved Si mold 14 to directly inscribe on moving substrate, thereby creating seamless micro- and nanopatterns 100 in a continuous fashion. Dynamic Nano-Inscribing shares similarities with room temperature nanoimprinting and relies on the plastic deformation of the inscribed material. However, in contrast to nanoimprinting, the deformation in Dynamic Nano-Inscribing according to the present teachings takes place under gradually increased pressure over a very small contacting region where the sharp edge 12 of the tilted Si mold 14 engages the substrate 10. As a result, continuous linear patterns with infinite length on various polymers, metals or even hard materials, such as Indium Tin Oxide (ITO), can be successfully created by using very low applied forces (several Newtons), and with a speed drastically faster than other nanopatterning techniques.

The Dynamic Nano-Inscribing process can be separated into four sequential steps as depicted in FIG. 1a. First, in region (1), the mold 14 makes the initial contact with the substrate material 10 to be inscribed. The substrate material 10 can comprise one or more layers of materials, such as, but not limited to, a top layer 16, an intermediate layer 18, and a base layer 20. In some embodiments, top layer 16 can be a metal layer, intermediate layer 18 can be a polymer later, and base layer 20 can be an elastic cushion layer. It should be recognized that other material compositions or orientations can be realized. Therefore, in region (1), mold 14 can make initial contact with top metal layer 16 of substrate 10.

Second, in region (2), the intermediate polymer layer 18 of substrate 10 can be imprinted with gradually increased pressure as the Si mold 14 moves relative thereto. Third, in region (3), the sharp edge 12 of the cleaved Si mold 14 defines the location where most of the plastic deformation occurs since the pressure is the highest in this region. Finally, in the elastic recovery region (4), the pressed polymer in intermediate polymer layer 18 recovers by a certain amount and determines the final geometry. Note that throughout the whole Dynamic Nano-Inscribing process, the metal layer 16 still remains on top of the imprinted polymer layer 18 without being removed, which supports the plastic deformation as the pattern formation mechanism rather than material removal.

There are several important properties a substrate material should possess to maximize the Dynamic Nano-Inscribing process. Since Dynamic Nano-Inscribing relies on the plastic deformation of the polymer material in intermediate layer 18, materials with lower modulus are preferred to achieve large deformation under a given applied force. Moreover, toughness is another very important property in Dynamic Nano-Inscribing. Material having a low toughness can be easily fractured by the sharp edge 12 of the Si mold 14 and can generate debris during the Dynamic Nano-Inscribing process; and the accumulated debris further hampers the inscribing process. Therefore, materials with sufficiently high toughness are preferred for faithful and debris-free pattern formation.

In some embodiments, the optional elastomeric cushion layer 20 beneath the inscribed polymer layer 18 can be used to ensure conformal contact between the substrate 10 and the edge 12 of the Si mold 14. Specifically, this can aid in situations where the substrate 10 is not perfectly flat, but has terraces that affect the cleaving step.

Dynamic Nano-Inscribing can create debris-free nanoscale gratings without causing mold damage because it employs a large negative rake angle ($\alpha<0$) in the process (see FIG. 1a), which means the mold 14 is almost parallel to the top surface 16 of the substrate 10. In general mechanics, a negative rake angle has low material removal capability but provides better mechanical stability for the brittle tool materials such as ceramic or diamond. Dynamic Nano-Inscribing utilizes both characteristics from a negative rake angle to create continuous nano gratings without generating debris nor damaging the mold 10.

The cross sectional profile of the metal nano gratings created by the Dynamic Nano-Inscribing process depends on the end shape of the grating structure of the mold 14. As shown in FIG. 1b, when a Si grating mold 14 with a flat-tip 22 is used, the metal layer 16 deforms and follows the shape of the inscribed polymer pattern and forms continuous metal gratings. On the other hand, when the metal layer 16 is inscribed by a mold 14 with a sharp-tip 24, the metal film breaks at the midpoint where it meets the tip 24 of the mold 14. As a result, metal lines with discrete metal caps are formed on top of the inscribed polymer gratings (FIG. 1c).

Figure 2A:
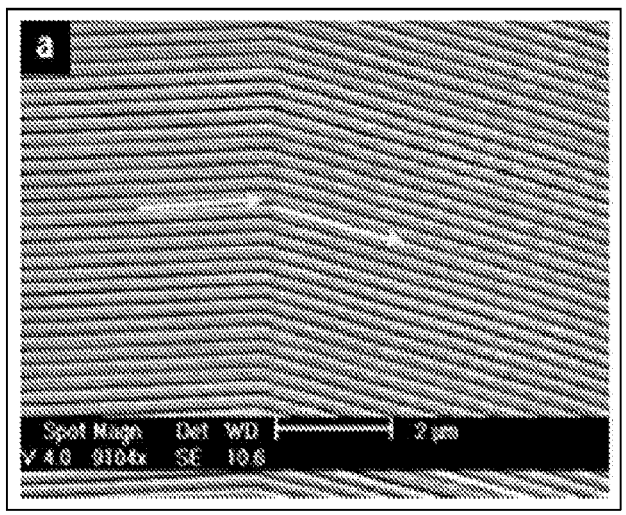
Figure 2B:
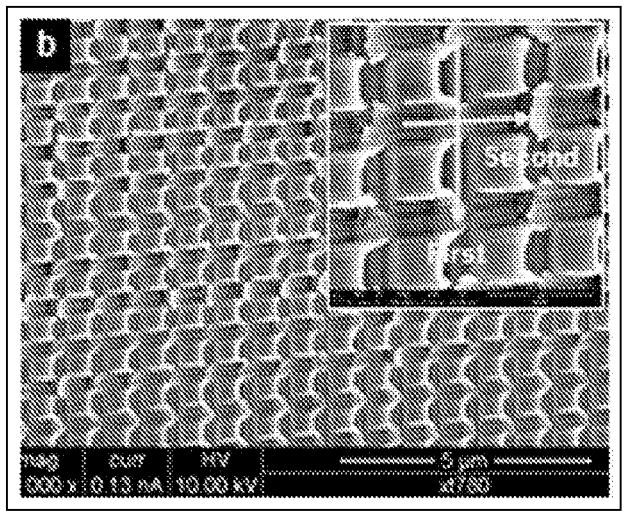

Dynamic Nano-Inscribing can proceed in straight linear fashion or in free forms by changing the moving direction of the substrate 10 with respect to the orientation of the mold grating 14. FIG. 2a shows angled but continuous 200 nm period gratings that were created by sharply turning the substrate 10 during the room-temperature Dynamic Nano-Inscribing process (RT-DNI). Such a feature is impossible to achieve by the regular NIL process using a linear grating mold. Similarly, FIG. 2b illustrates square-shaped gold nano-patterns fabricated by two consecutive Dynamic Nano-Inscribings carried out in orthogonal directions.

Figure 2C:
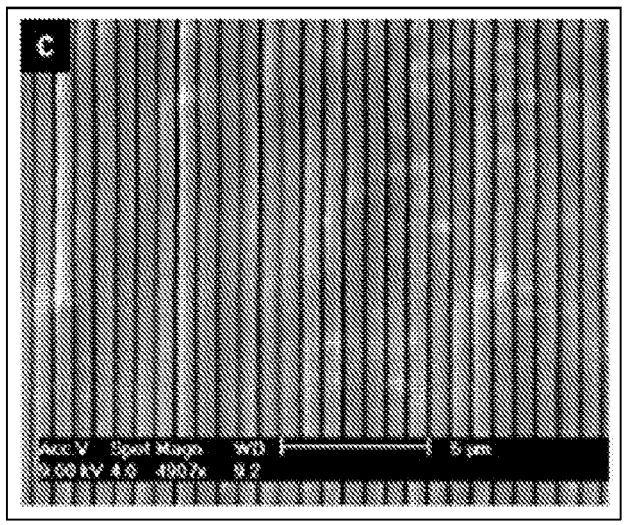

Dynamic Nano-Inscribing is not limited to only polymeric and ductile metallic materials. Direct inscribing of much harder materials, such as conductive Indium Tin Oxide (ITO), is also successfully demonstrated by RT-Dynamic Nano-Inscribing. FIG. 2c shows 700 nm period nano gratings directly created on an ITO-coated PET substrate. ITO is a very hard material having a modulus (97 GPa) but slightly smaller than that of Si. Therefore, it is very difficult to directly pattern on ITO surface by conventional fabrication techniques, but Dynamic Nano-Inscribing provides a unique solution for ITO nano patterning.

In some applications, conventional roll-to-roll printing technique can offer high-speed patterning in a continuous fashion. But roller based printing technology generally requires a large-area, flexible mold to wrap around a roller surface, and at least one seam per revolution exists where the two ends of the flexible mold meet. However, in the Dynamic Nano-Inscribing of the present teachings, infinitely long and seamless grating patterns can be generated by using just a small slice of the cleaved Si mold 14. This feature could find potential application in, but not limited to, large format displays and in creating long polymer nanofibers. In this respect, a high speed roll-to-roll process can fully take advantages of the many benefits offered by Dynamic Nano-Inscribing.

Referring now to FIG. 3a, a 22 inch long, half inch wide, 700 nm period, seamless nano-grating pattern is illustrated that was created on a polycarbonate strip using roll-to-roll Dynamic Nano-Inscribing. The inset of FIG. 3b shows the SEM image of the grating. In this case, the web speed is 10 cm/sec, which is significantly faster than the NIL technique. It should be understood that the web speed can further be increased by at least an order of magnitude or higher in practical applications by proper tool design. Such high speeds are possible because Dynamic Nano-Inscribing relies on the plastic deformation, which can occur on a time scale of micro-sec. In comparison, regular NIL relies on the filling of the cavity features on the mold by the polymer materials, which takes much longer time (seconds to minutes, depending on the material viscosity). In addition, continuous and curved nanograting patterns over a large area is another unique capability of Dynamic Nano-Inscribing, which is very difficult to achieve by other nanopatterning techniques. In FIG. 3c, concentric circular nano-gratings are demonstrated on a fluoropolymer film, ethylene-tetrafluoroethylene, fabricated by a rotating Dynamic Nano-Inscribing process. Such structures may find potential applications in magnetic data storage such as discrete track media.

Furthermore, since Dynamic Nano-Inscribing only requires essentially line contact with the substrate 10, it offers a convenient method to pattern on curved surfaces. As an example, 700 nm period nano gratings created on a curved surface are shown in FIG. 3d. In this result, the patterns are inscribed on a common photoresist, SU-8, which is coated on the hemi-cylindrical PDMS surface and subsequently cured by UV light. Nano-scale metal electrodes or patterned organic materials on the curved surface are potentially useful for light detection or energy generating devices.

Even though Dynamic Nano-Inscribing can be performed in most cases under the ambient environment, heating of the polymer layer 18 during the inscribing process can effectively reduce the modulus of the material and enhance its toughness, which can lead to more faithful polymer patterns. However, bulk heating of the whole substrate results in significant pattern deformation due to polymer flow at elevated temperatures. Therefore, according to the principles of the present teachings, conductive heating of the Si mold 14 can be used to localize the heating to only a very small region of the moving substrate where the Si mold 14 is engaged. Such localized heating allows the patterned structure to quickly cool down after the inscription, and also does not affect the inscribed structures away from the mold contact region. As illustrated in FIG. 4a, the localized heating-assisted Dynamic Nano-Inscribing (LH-DNI) is provided. The Si mold 14 can be directly heated by a heating element 30 with temperature controller (HOTSET Inc.). As shown in FIG. 4b, the pattern depth in the polycarbonate/polymer layer 18 increases with temperature under the same applied force (4.2 N) and web speed (2.5 mm/sec) conditions. Polycarbonate nano gratings fabricated at room temperature (RT-DNI) show a shallow and rounded profile (FIG. 4c), while the sample fabricated by localized heating-assisted Dynamic Nano-Inscribing at 140° C., a temperature slightly lower than the Tg of polycarbonate (150° C.), shows much deeper trenches and sharper edges, representing a more faithful replication (FIG. 4d) of the grating structure on the original mold (FIG. 4e).

Figure 4F:
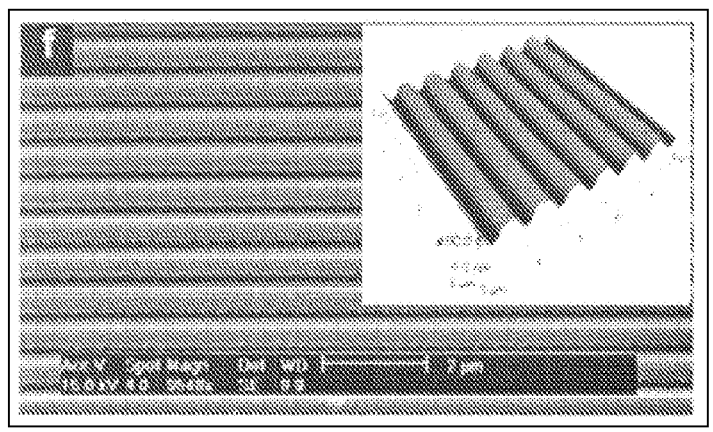
Figure 4G:
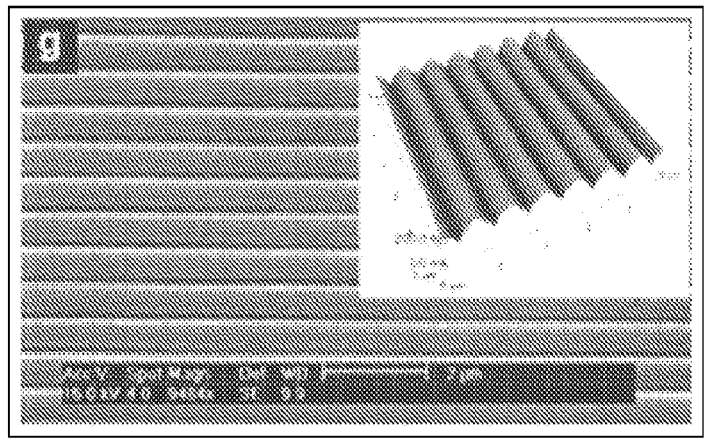

In localized heating-assisted Dynamic Nano-Inscribing, even though heat is applied, the actual time for heat transfer to the substrate is only on the order of tens of microseconds, which is several orders of magnitude shorter than the heating time used in a typical thermal NIL process. This can drastically minimize any potential damage to thermal sensitive materials. Applicant has demonstrated Dynamic Nano-Inscribing on conductive polymer, poly(3,4-ethylenedioxythiophene) (PEDOT) and an organic semiconductor—conjugated polymer poly(3-hexylthiophene) (P3HT), which are representative materials commonly used in organic electronics and organic optoelectronics. It has been found that nano patterned P3HT in organic photovoltaics shows enhanced light absorption and an increase in overall solar cell efficiency. In addition, various techniques have been explored to pattern micro or nano structures on P3HT and PEDOT for applications in organic photovoltaics, organic TFTs and organic LEDs. Compared to these referenced techniques, Dynamic Nano-Inscribing provides superior throughput and a simple one-step process for patterning organic functional materials while minimizing possible thermal damage. FIGS. 4f and 4g show 700 nm period nano gratings directly created on PEDOT and P3HT coated PET respectively by localized heating-assisted Dynamic Nano-Inscribing at 90° C.

It has also been found that the Dynamic Nano-Inscribing process of the present teachings can be completed in an oxygen-free environment to prevent the oxidation effect and further preserve the functionality of the conjugated polymers. A potential application is in the field of organic solar cells, where Dynamic Nano-Inscribing could be used to directly inscribe conjugated polymers to produce the ordered nanoscale interface between a donor and an acceptor organic semiconductors for efficient charge separation and charge transport.

Figure 4H:
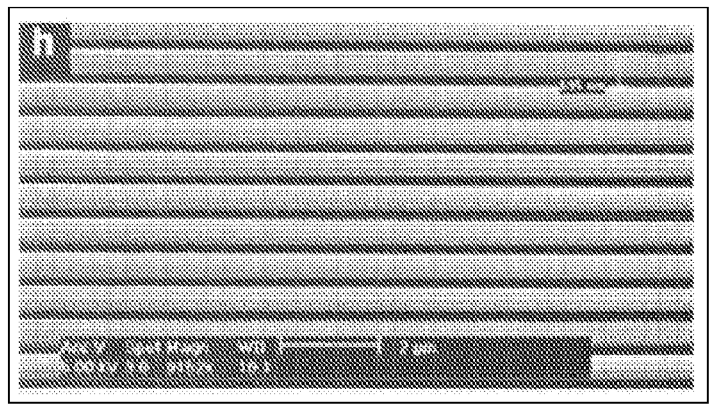

As another example of patterning functional polymers, Nano-inscribing of NAFION film (DuPont: sulfonated tetrafluoroethylene based fluoropolymer-copolymer), an important polymer material in electrochemistry, has been explored. NAFION film serves an important role as the ion exchange membrane in fuel cells due to its excellent proton conductivity, and its thermal and mechanical stability. Recently it has been reported that nano patterning of NAFION can provide enhanced efficiency in micro-fuel cells by increasing the electrochemical active surface areas. In FIG. 4h, well defined 700 nm period gratings are created in NAFION film by a simple Dynamic Nano-Inscribing process using localized heating at 80° C.

Finally as an application in photonics, it has been found that a metallic grating fabricated by a one-step Dynamic Nano-Inscribing can be used to construct negative refractive index metamaterials. Negative refraction requires a simultaneously negative permittivity and permeability. While negative permittivity is readily achievable in metallic structures due to plasmon dispersion, negative permeability can only be obtained in specially designed artificial structures. Previously, several variations of the so-called split-ring resonator (SRR) structures have been exploited to produce magnetic response and negative permeability. Recently an elongate SRR structure has been demonstrated by using direct laser writing and silver chemical vapor deposition, which offers the advantage of normal incidence. To produce magnetic response and negative permeability at shorter wavelength ranges (e.g. visible band), the dimension of the subwavelength element in the structure has to be reduced accordingly. A Split-Ring-Resonant-Grating (SRRG) structure fabricated by nanoimprinting and metal film deposition was studied, which showed the potential of achieving negative refraction at visible wavelengths.

According to the present teachings, one can fabricate 200 nm period (30 nm trench) SRRG structure using the Dynamic Nano-Inscribing process (FIG. 5a). To achieve this structure, 20 nm thick silver is thermally deposited on a polycarbonate film and simply inscribed using a 200 nm period Si mold at room temperature. FIG. 5b shows the transmittance spectra of the sample of FIG. 5a for both TM (transverse magnetic) and TE (transverse electric) polarization, showing particularly strong TM mode transmission valleys at visible wavelength range of 430 nm and 590 nm. Based on simulation, it was determined that the valley at 430 nm is due to electrical resonance while the valley at 590 nm is due to magnetic resonance and leads to negative permeability. Further optimization of the structure to demonstrate negative index at visible band is currently underway. As compared with NIL and other nano fabrication techniques, Dynamic Nano-Inscribing provides a very simple, single step process to create large area continuous nano metal grating patterns for negative index metamaterial applications.

In summary, according to the principles of the present teachings, a new nano patterning technique, Dynamic Nano-Inscribing, for directly creating truly continuous nano grating patterns in a variety of metal and polymer materials at ambient temperature or with localized heating is provided. With a demonstrated resolution of at least 30 nm and a speed of at least 10 cm/s, it is envisioned that Dynamic Nano-Inscribing can be applied into many practical applications in optics, flat panel displays, and bio-industries that require a non-toxic, room temperature environment to produce well-defined nanopatterns at extremely high-speed.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for creating continuous nano-scale groove features in a material, said method comprising:
   moving a substrate relative to an inclined mold; and
   contacting said inclined mold on said substrate during said movement resulting in plastic deformation of said substrate under increased pressure to form the nano-scale groove features.

2. The method according to claim 1 wherein said moving said substrate relative to said inclined mold comprises:
   moving a multilayer substrate relative to an inclined silicon mold, said multilayer substrate having an upper layer and a lower layer.

3. The method according to claim 2 wherein said moving said substrate relative to said inclined mold comprises a multilayer substrate having an upper metallic layer and a lower polymer layer, said upper metallic layer being sufficiently tough to prevent debris formation during said contacting said inclined silicon mold on said substrate.

4. The method according to claim 1 wherein said moving said substrate relative to said inclined mold comprises moving said substrate relative to an inclined mold, said inclined mold having an edge and an inclined sloped surface extending from said edge, said edge engaging said substrate such that a portion of said inclined sloped surface contacts said substrate and exerts a force thereon and a portion of said inclined sloped surface remains above said substrate in a non-contacting relationship therewith.

5. The method according to claim 4 wherein said inclined sloped surface contacting said substrate results in said increased pressure as said substrate is moved relative to said inclined mold.

6. The method according to claim 1 wherein said moving a multilayer substrate relative to an inclined mold comprises a multilayer substrate having an upper metallic layer, a lower cushion layer, and an intermediate polymer layer disposed therebetween, said lower cushion layer being elastomeric.

7. The method according to claim 1, further comprising:
   heating at least one of said substrate and said inclined mold prior to or concurrently with said step of contacting said inclined mold on said substrate during said movement resulting in plastic deformation of said substrate under increased pressure to form the nano-scale groove features.

8. The method according to claim 1, further comprising:
   heating at least a portion of said inclined mold prior to or concurrently with said step of contacting said inclined mold on said substrate during said movement resulting in plastic deformation of said substrate under increased pressure to form the nano-scale groove features.

9. The method according to claim 1 wherein said inclined mold is made from cleaved silicon wafer with surface patterns.

10. The method according to claim 1 wherein said moving said substrate relative to said inclined mold comprises moving said substrate relative to said inclined mold in a non-linear direction to define non-linear nano-scale groove features.

11. A method for creating a pattern in a material, said method comprising:
providing a mold having an edge portion and an inclined surface extending from said edge portion;
providing a substrate member to be shaped;
contacting said substrate member with said mold; and
moving said substrate member and said mold relative to each other such that said edge portion and said inclined surface contacts said substrate member, said inclined surface contacts said substrate member at a first section and exerts a first force upon said substrate member, said inclined surface further contacts said substrate member at a second section downstream from said first section and exerts a second force upon said substrate member, said second force being greater than said first force, said edge portion contacts said substrate member at a third section downstream from said second section and exerts a third force upon said substrate member, said third force being greater than said second force, said mold causing plastic deformation of said substrate member in at least said third section to form the pattern.

12. The method according to claim 11 wherein said moving said substrate member and said mold relative to each other further defines a fourth section downstream of said third section permitting partial elastic recovery of said substrate member.

13. The method according to claim 11 wherein said providing said substrate member to be shaped comprises providing a multilayer substrate member having an upper layer and a lower layer.

14. The method according to claim 11 wherein said providing said substrate member to be shaped comprises providing a multilayer substrate member having an upper metallic layer and a lower polymer layer, said upper metallic layer being sufficiently tough to prevent debris formation during said contacting of said mold and said substrate member.

15. The method according to claim 11 wherein said providing said substrate member to be shaped comprises providing a multilayer substrate member having an upper metallic layer, a lower cushion layer, and an intermediate polymer layer disposed therebetween, said lower cushion layer being elastomeric.

16. The method according to claim 11, further comprising:
heating at least one of said substrate member and said mold prior to said step of moving said substrate member and said mold relative to each other such that said edge portion and said inclined surface contacts said substrate member.

17. The method according to claim 11, further comprising:
heating at least a portion of said inclined surface of said mold prior to said step of moving said substrate member and said mold relative to each other such that said edge portion and said inclined surface contacts said substrate member.

18. The method according to claim 11 wherein said providing a mold having said edge portion and said inclined surface extending from said edge portion comprises providing a mold having said edge portion having a flat tip portion at a distal end thereof.

19. The method according to claim 11 wherein said moving said substrate member and said mold relative to each other such that said edge portion and said inclined surface contacts said substrate member comprises moving said substrate member and said mold relative to each other in a non-linear direction to form a non-linear pattern.

* * * * *